United States Patent [19]

De Santis

[11] 4,062,988
[45] * Dec. 13, 1977

[54] ANIMAL FEED BLOCK

[75] Inventor: Stanislao A. De Santis, Rolling Hills, Calif.

[73] Assignee: Milo Don Appleman, Los Angeles, Calif. ; a part interest

[*] Notice: The portion of the term of this patent subsequent to Apr. 5, 1994, has been disclaimed.

[21] Appl. No.: 707,510

[22] Filed: July 22, 1976

Related U.S. Application Data

[63] Continuation-in-part of Ser. No. 668,225, March 18, 1976, Pat. No. 4,016,296.

[51] Int. Cl.² .................................................. A23K 1/02
[52] U.S. Cl. ...................................... 426/656; 426/69; 426/657; 426/807
[58] Field of Search ................... 426/69, 74, 103, 656, 426/657, 658, 623, 630, 807

[56] References Cited

U.S. PATENT DOCUMENTS

| 3,420,672 | 1/1969 | Appleman | 426/807 |
| 3,532,503 | 10/1970 | Kviesitis | 426/807 X |
| 3,901,976 | 8/1975 | Roth et al. | 426/69 |
| 4,016,296 | 4/1977 | DeSantis | 426/69 |

*Primary Examiner*—R. B. Penland
*Attorney, Agent, or Firm*—Donald Diamond

[57] ABSTRACT

Molasses, a fatty acid soap former such as yellow grease, a hard metallic soap former such as calcium oxide and a natural protein source such as cottonseed meal are blended and mixed to obtain a nutrient composition which sets to a hard block.

16 Claims, No Drawings

ANIMAL FEED BLOCK

CROSS-REFERENCE TO RELATED APPLICATION

This application is a continuation-in-part of U.S. patent application Ser. No. 668,225 filed on Mar. 18, 1976 now U.S. Pat. No. 4,016,296 and entitled Animal Feed Block.

BACKGROUND

This invention relates to animal feed and, more particularly, to animal feed in hard, block form.

In range land, for much of the year, only dry grass is available for providing carbohydrates and some protein to grazing animals. This grass does not provide the requisite amount of protein and fat to enable grazing animals such as range cattle to put on good gain and finish. Accordingly, there is a significant need for an economical, high energy, nutrionally balanced, hard, climatically stable, animal feed block which can be placed on range land for utilization as animal feed.

It is known in the art to prepare hard, animal feed blocks by, for example, (a) compressing and molding a mix of hay, straw, grains and the like, with or without molasses, to a desired shape and weight, or (b) by heating and evaporating water from a molasses-fat-urea mixture, usually under vacuum conditions, with the resulting mix setting, on cooling, to a hard form. In U.S. Pat. No. 3,420,672 (Appleman, 1969) it is disclosed that gelatinized starch can be utilized as an emulsifying agent in the preparation of solid, animal feed emulsions containing molasses, fatty material, urea, phosphate, bentonite or kaolin, and other ingredients and additives.

Copending U.S. patent application Ser. No. 668,225 is directed to animal feed blocks and the preparation thereof wherein molasses and a water absorbent clay such as attapulgite clay are subjected to high speed shearing action to obtain a dispersion thereof; and thereafter the dispersion is mixed with a water binding agent such as calcium sulfate hemihydrate, a hard metallic soap former such as calcium oxide, a fatty acid soap former such as yellow grease, and one or more of the following: natural protein source such as cottonseed meal, non-protein nitrogen source such as urea, a phosphorous source such as phosphoric acid, and fat such as tallow to thereby obtain a nutrient composition which sets to a hard block.

SUMMARY OF THE INVENTION

Application Ser. No. 668,225 calls for the presence of a water absorbent clay and a water binding agent in the preparation of animal feed blocks. Example 1b of that application discloses that animal feed blocks can be prepared without utilizing calcium sulfate hemihydrate or calcium chloride as a water binding agent.

In accordance with this invention, it has been unexpectedly discovered that animal feed blocks similar to those described in application Ser. No. 668,225 can be readily, easily and economically prepared without using a water absorbent clay such as attapulgite clay or a water binding agent such as calcium sulfate hemihydrate although a water absorbent clay or a water binding agent may, optionally, be present.

Thus, in one aspect of this invention there is provided an animal feed block comprising molasses, hard soap and a natual protein source.

In a second aspect of this invention there is provided a process for preparing an animal feed block which comprises blending and mixing molasses, hard metallic soap former, fatty acid soap former and natural protein source to obtain a homogenous nutrient composition which sets to a hard block.

DETAILED DESCRIPTION

Composition

Molasses, which is derived as a byproduct from the crystallization of cane or beet sugar, comprises mainly invert sugar, sucrose, water, salts and other carbohydrates. Molasses has varying amounts of solids which affects its viscosity and the measure of the amount of such solids is normally given in terms of Brix. The molasses used in this invention has a consistency varying from a relatively thin to a thick syrup and normally falls within the range of 60°-90° Brix, although molasses of 78°-88° Brix is generally preferred. The concentration of the molasses in the compositions of the invention is generally from about 25 to about 75% by weight and preferably from about 40 to about 60% by weight.

The hard soap, which is present, is formed in situ during preparation of the hard block by the reaction of a hard metallic soap former with a fatty acid soap former. The concentration of the hard soap in the feed block is generally from about 0.5 to about 10% by weight and preferably from about 1 to about 3% by weight. Hard metallic soap formers which can be utilized in the preparation of the feed block include calcium oxide, sodium hydroxide and mixtures thereof. Calcium oxide is preferred because, in addition to its basicity, it has water binding properties which facilitate the formation of a hard feed block. The fatty acid soap formers which can be employed in this invention include, for example, yellow grease, brown grease, acidulated soap stock, acidulated oils and acidulated fats. Yellow grease and brown grease are trade terms for reclaimed fats and grease which are acid or have been chemically treated to provide an acid constituency. Acidulated soap stock is the trade term for fatty acids prepared by treating soap stock with acid. Soap stock is the residue left after animal and vegetable fats and oils have been reacted with alkali to make soap. The metallic soap former is generally employed in an amount from about 0.5 to about 5% by weight and preferably in an amount from about 1 to about 3% by weight. The fatty acid soap former is generally used in amount from about 2 to about 20% by weight and preferably in an amount from about 5 to about 12% by weight.

The natural protein source can be a plant source derivative, an animal source derivative or a mixture of such derivatives and is, advantageously, in ground form. Examples of plant sources are: cottonseed meal (approx. 40-41% protein), soybean meal (approx. 45-46% protein), peanut meal (approx. 45-47% protein), and cell cream (cell residue from the production of monosodium glutamate, (approx. 75% protein). Examples of animal sources are: dried blood, meat and bone meal, and feather meal. The natural protein source is present in an amount to make up 100% by weight of the composition with the minimum concentration of the natural protein source being at least about 20% by weight in order to obtain effective setting of the nutrient composition in block form.

In addition to molasses, hard soap and natural protein source, the nutrient block of this invention may contain one or more of the following constituents: non-protein nitrogen source, phosphorous source and fatty material.

Non-protein nitrogen sources include urea and ammonium salts such as ammonium sulfate. These compounds can be used at certain levels by ruminants since they are converted into protein substances in the rumen. The non-protein nitrogen source may be used in an amount from about 2 to about 10 % by weight while a preferred concentration is from about 5 to about 8% by weight.

Phosphorous may be obtained from any suitable source. Examples of such sources are: monosodium phosphate ($NaH_2PO_4.H_2O$), calcium superphosphate $CaH_4(PO_4)_2.H_2O$, ammonium phosphate and phosphoric acid. The phosphorous source may be present in an amount to provide about 0.5 to about 7% by weight of phosphorous.

Fatty material which may be employed in the feed block include fatty acids and/or fats with the latter being glyceryl esters of fatty acids. The fatty acids which may be used correspond to those herein identified as fatty acid soap formers, namely, yellow grease, brown grease, acidulated soap stock, acidulated oils and acidulated fat. When a fatty acid soap former is also being used as fatty material, it is present in excess of the amount required for hard soap formation with the excess concentration being in the range of about 1 to about 10% by weight. The fats which can be used in the nutrient block include live-stock edible animal and vegetable fats and oils such as soybean oil, cottonseed oil, sesame oil, olive oil, corn oil, fish oil, grease, tallow, beef fat and the like. Fat may be present in an amount from about 1 to about 5% by weight.

Water absorbent clays and water binding agents may advantageously, but optionally, be included in the nutrient feed block formulation.

The water absorbent clays which can be employed include attapulgite clay, bentonite, kaolin and mixtures thereof as well as chemically modified clays. The clay constituent is generally present in the animal feed block in an amount from about 0.5 to about 5% by weight and, preferably, in an amount from about 1 to about 2.5% by weight. Although good results are attained with each of the aforementioned clays, attapulgite clay is preferred because it produces a harder feed block.

The water binding agents which can be utilized include calcium sulfate hemihydrate, calcium chloride and mixtures thereof in an amount generally from about 0.2 to about 3% by weight and preferably from about 1 to about 2% by weight.

Various special purpose additives may also be included in the feed block such as trace minerals, vitamins, magnesium compounds, alkaline compounds, preservatives and antioxidants.

METHOD

In the following description of the method for preparing the animal feed block of this invention, the chemical nature of the ingredients and the proportions thereof are the same as those hereinabove set forth with respect to the description of the composition.

In general, the animal feed block is prepared by blending and mixing molasses, natural protein source, fatty acid soap former, and hard metallic soap former together with desired optional additives in a suitable mixing apparatus at ambient or elevated temperature. While the order of addition of ingredients during the mixing step is not critical, it is advantageous to add natural protein amongst the last ingredients. When water absorbent clay is to be employed in the feed block formulation, then it is advantageous to prepare the feed block by initially subjecting the molasses and the water absorbent clay to high speed shearing action at ambient or elevated temperature to obtain a dispersion thereof and thereafter blend and mix the dispersion with the other ingredients of the formulation.

The nutrient composition produced by the mixing step comprises a uniform dispersion of ingredients in the form of a thick liquid solution, soft sol or gel which can be poured or extruded from the mixer and which sets to hard or relatively hard feed block.

The feed blocks of this invention are climatically stable and are particularly well suited for use as range feed. The nutrient blocks described herein can also be used in feedlots and elsewhere.

The following examples further illustrate the invention.

EXAMPLE I

This example illustrates the preparation of an animal feed block containing molasses, water absorbent clay, phosphate, fatty acid soap former, hard metallic soap former and natural protein source. The water absorbent clay was attapulgite clay (hydrous magnesium aluminum silicate). The nutrient composition was prepared by subjecting molasses and clay to high speed shearing action in a Waring Blender to obtain a dispersion thereof and then transferring the dispersion to a mixer and adding the other ingredients, with mixing, to obtain a settable nutrient dispersion.

|  | Grams 1a | % by wt. |
|---|---|---|
| Waring Blender |  |  |
| Molasses 78° Brix | 1,000 | 50.25 |
| Attapulgite clay | 40 | 2.01 |
| (Shear 2 min.) |  |  |
| Mixer |  |  |
| (Molasses/clay) |  |  |
| $CaH_4(PO_4)_2 . H_2O$ | 140 | 7.035 |
| Yellow grease | 200 | 10.05 |
| Calcium oxide | 10 | 0.503 |
| Cottonseed meal | 600 | 30.15 |

Example 1a, which contained approximately 12% protein and formed a hard block, had the consistency of a thick slurry which would be extruded for packaging purposes on a production basis. Example 1a was repeated using hot molasses (55° C) and the formulation produced an even harder block.

In the following examples, the compositions were prepared by blending and mixing the ingredients with the mixing being carried out in an electrically actuated mixer in the nature of a cake-batter type mixing apparatus.

EXAMPLE II

This example illustrates the preparation of animal feed blocks containing molasses, phosphate, fatty acid soap former, hard metallic soap former and cottonseed meal. The compositions contained neither water absorbent clay nor water binding agents. Runs were carried out with molasses at ambient (22.2° C) and elevated (80° C) temperatures.

| Ingredients | Percent by weight | |
|---|---|---|
| | 2a | 2b |
| Molasses 78° Brix | 50 | 50 |
| CaH$_4$(PO$_4$)$_2$ . H$_2$O | 7 | 7 |
| Yellow grease | 10 | 10 |
| Calcium oxide | 0.5 | 3 |
| Cottonseed meal | 30 | |

Formulation 2b containing 3% calcium oxide set to a much harder block than formulation 2a which contained 0.5% calcium oxide. Formulations 2a and 2b prepared with molasses at 80° C set harder and much faster than corresponding formulations prepared with molasses at ambient temperature. The compositions prepared at elevated temperatures set to moderately hard blocks in about 24 hours while the compositions prepared at ambient temperature required several days to set in block form.

EXAMPLE III

This example illustrates the preparation of animal feed blocks containing molasses, phosphorous source, fatty acid soap former, hard metallic soap former, water binding agent and natural protein source. The compositions did not contain water absorbent clay. The mixing step was carried out with hot molasses.

| Ingredients | Percent by weight | |
|---|---|---|
| | 3a | 3b |
| Molasses 78° Brix | 50 | 50 |
| H$_3$PO$_4$ (85%) | — | 4 |
| (CaHPO$_4$)$_2$ . H$_2$O | 7 | — |
| Yellow grease | 10 | 10 |
| Calcium oxide | 3 | 3 |
| CaSO$_4$ . ½H$_2$O | 2 | 2 |
| Cottonseed meal | 28 | 31 |

Each of formulations 3a and 3b was mixed between 5 and 10 minutes and each set to a hard block. However, 3a became harder more rapidly than 3b.

EXAMPLE IV

This example illustrates the preparation of an animal feed block containing molasses, fatty acid soap former, hard metallic soap former, water binding agent and natural protein source. This example shows that a phosphorous source is not essential to the formation of a hard block.

| Ingredients | % by wt. 4a |
|---|---|
| Molasses 78° Brix (hot) | 53 |
| Yellow grease | 10 |
| Calcium oxide | 3 |
| CaSO$_4$ . ½H$_2$O | 2 |
| Cottonseed meal | 32 |

Formulation 4a set to a block having a hardness approximating that of formulation 3a.

EXAMPLE V

A series of runs were carried out in which the concentration of natural protein source was varied from 18 to 30% by weight. It was found that at least about 20% by weight of natural protein source is required in the composition in order to obtain a feed block which is sufficiently hard for practical purposes.

| Ingredients | Percent by weight | | | |
|---|---|---|---|---|
| | 5a | 5b | 5c | 5d |
| Molasses 78° Brix (hot) | 60 | 56 | 52 | 48 |
| Ca(HPO$_4$)$_2$ . H$_2$O | 7 | 7 | 7 | 7 |
| Yellow grease | 10 | 10 | 10 | 10 |
| Calcium oxide | 3 | 3 | 3 | 3 |
| Calcium sulfate . ½H$_2$O | 2 | 2 | 2 | 2 |
| Cottonseed meal | 18 | 22 | 26 | 30 |

Formulation 5a was considered to be too soft for practical purposes. Formulation 5a was fairly hard at 36 hours. Formulations 5c and 5d were boxed and became sufficiently hard in 5 hours to permit stacking of the boxes.

EXAMPLE VI

A series of runs were carried out in which formulation 5c was modified to include (a) dextrose, (b) corn steep liquor solids, (c) spray dried meat solubles and (d) whey concentrate in order to determine the effect of such on hardness of the feed block.

| Ingredients | Percent by weight | | | |
|---|---|---|---|---|
| | 6a | 6b | 6c | 5d |
| Molasses 78° Brix (hot) | 52 | 52 | 52 | 52 |
| Ca(HPO$_4$)$_2$ . H$_2$O | 7 | 7 | 7 | 7 |
| Yellow grease | 10 | 10 | 10 | 10 |
| Calcium oxide | 3 | 3 | 3 | 3 |
| CaSO$_4$ . ½H$_2$O | 2 | 2 | 2 | 2 |
| Dextrose | 5 | — | — | — |
| Corn steep liquor solids | — | 5 | — | — |
| Spray dried meat solubles | — | — | 5 | — |
| Whey concentrate | — | — | — | 5 |
| Cottonseed meal | 21 | 21 | 21 | 21 |

The hardness of the blocks produced by formulations 6a through 6d was similar to the hardness of the block produced from formulation 5c.

EXAMPLE VII

This example illustrates that natural protein material must be present in the formulation in order to have nutrient composition which will set to a hard form. A series of runs were carried out using the following ingredients.

| Ingredients | Percent by weight | | | |
|---|---|---|---|---|
| | 7a | 7b | 7c | 7d |
| Molasses 78° Brix (60° C) | 87 | 86 | 83 | 83 |
| Yellow grease | 10 | 10 | 10 | 10 |
| Calcium oxide | 3 | 2 | 3.5 | 3 |
| Calcium chloride | — | 2 | 0.5 | — |
| Ca(HPO$_4$)$_2$ . H$_2$O | — | — | 3.5 | 2 |
| CaSO$_4$ . ½H$_2$O | — | — | — | 2 |

None of formulations 7a through 7d produced a thick gel. 7a was a thick liquid with hard soap present. 7b ws a very light, pourable gel. 7c and 7d were pastes having a consistency thicker than molasses.

The animal feed blocks of this invention are particularly palatable to and rapidly consumed by cattle. To slow down the rate of consumption of the feed blocks, the compositions thereof may be formulated with fish derivatives such as fish meal, fish solubles and/or fish oil in an amount from about 1 to about 5% by weight. Oil of capsicum at approximately 1 part to 30,000 parts of nutrient composition can also be used for this purpose.

In view of the foregoing description and examples, it will become apparent to those of ordinary skill in the art That which is claimed is:

1. An animal feed block comprising:
   about 25 to about 75% by weight of molasses;
   about 0.5 to about 10% by weight of hard soap; and
   natural protein source to make up 100% by weight of said feed block with the minimum concentration of said natural protein source in said feed block being at least about 20% by weight.

2. A feed block according to claim 1 which also includes about 0.2 to about 3% by weight of water binding agent.

3. A feed block according to claim 2 which is further formulated with a phosphorous source in an amount from about 0.5 to about 7% by weight calculated as phosphorous.

4. A feed block according to claim 1 which also includes about 0.5 to about 5% by weight of water absorbent clay.

5. A feed block according to claim 4 which is further formulated with a phosphorous source in an amount from about 0.5 to about 7% by weight calculated as phosphorous.

6. A feed block according to claim 1 wherein: molasses is present in an amount from about 40 to about 60% by weight; hard soap is present in an amount from about 1 to about 3% by weight with said hard soap being a member selected from the group consisting of calcium soap, sodium soap and mixtures thereof; and natural protein source is in ground form and is selected from the group consisting of plant source derivative, animal source derivative and mixtures of such derivatives.

7. A feed block according to claim 2 wherein the water binding agent is a member selected from the group consisting of calcium sulfate hemihydrate, calcium chloride and mixtures thereof and is present in an amount from about 1 to about 2% by weight.

8. A feed block according to claim 4 wherein the water absorbent clay is a member selected from the group consisting of attapulgite, bentonite, kaolin and mixtures thereof and is present in an amount from about 1 to about 2.5% by weight.

9. A process for preparing an animal feed block which comprises mixing:
   about 25 to about 75% by weight of molasses;
   about 0.5 to about 5% by weight of hard metallic soap former;
   about 2 to about 20% by weight of fatty acid soap former; and
   natural protein source to make up 100% by weight with the minimum concentration of said natural protein source being at least about 20% by weight;
   to thereby obtain a homogeneous nutrient composition which sets to a hard block, said percents by weight herein being based on the weight of the hard block.

10. A process according to claim 9 wherein the mixing formulation also includes about 0.2 to about 3% by weight of water binding agent.

11. A process according to claim 10 wherein the mixing formulation additionally includes a phosphorous source in an amount from about 0.5 to about 7% by weight calculated as phosphorous.

12. A process according to claim 9 wherein the mixing formulation also includes about 0.5 to about 5% by weight of water absorbent clay providing, however, that molasses and water absorbent clay are subjected to high speed shearing action to obtain a dispersion thereof and the dispersion is then mixed with the remainder of the formulation.

13. A process according to claim 12 wherein the mixing formulation additionally includes a phosphorous source in an amount from about 0.5 to about 7% by weight calculated as phosphorous.

14. A process according to claim 9 wherein: molasses is present in an amount from about 40 to about 60% by weight; hard metallic soap former is a member selected from the group consisting of calcium oxide, sodium hydroxide and mixtures thereof and is present in an amount from about 1 to about 3% by weight; fatty acid soap former is present in an amount from about 5 to about 12% by weight; and natural protein source is in ground form and is selected from the group consisting of plant source derivative, animal source derivative and mixtures of such derivatives.

15. A process according to claim 10 wherein the water binding agent is a member selected from the group consisting of calcium sulfate hemihydrate, calcium chloride and mixtures thereof and is present in an amount from about 1 to about 2% by weight.

16. A process according to claim 12 wherein the water absorbent clay is a member selected from the group consisting of attapulgite, bentonite, kaolin and mixtures thereof and is present in an amount from about 1 to about 2.5% by weight.

* * * * *